(12) United States Patent
Matsuo et al.

(10) Patent No.: US 7,095,216 B2
(45) Date of Patent: Aug. 22, 2006

(54) POWER SUPPLY METHOD AND APPARATUS

(75) Inventors: Masahiro Matsuo, Hyogo-ken (JP); Ritsuko Nomura, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 158 days.

(21) Appl. No.: 10/670,498

(22) Filed: Sep. 26, 2003

(65) Prior Publication Data

US 2004/0113495 A1    Jun. 17, 2004

(30) Foreign Application Priority Data

Sep. 27, 2002   (JP)   ............................. 2002-282524

(51) Int. Cl.
*G05F 1/577*    (2006.01)
(52) U.S. Cl. .................. 323/267; 323/222; 323/272
(58) Field of Classification Search ............... 323/222, 323/267, 272, 282, 351
See application file for complete search history.

(56) References Cited

U.S. PATENT DOCUMENTS

| | | | | |
|---|---|---|---|---|
| 5,412,308 A | * | 5/1995 | Brown | 323/267 |
| 6,150,860 A | * | 11/2000 | Chun | 327/198 |
| 6,201,374 B1 | * | 3/2001 | Ater et al. | 323/267 |
| 6,265,855 B1 | * | 7/2001 | Aas et al. | 323/272 |
| 6,437,545 B1 | * | 8/2002 | Sluijs | 323/222 |
| 6,522,110 B1 | * | 2/2003 | Ivanov | 323/267 |
| 6,900,620 B1 | * | 5/2005 | Nishimori et al. | 323/222 |

FOREIGN PATENT DOCUMENTS

| | | |
|---|---|---|
| JP | 04-172966 | 6/1992 |
| JP | 07-295662 | 11/1995 |
| JP | 08-228470 | 9/1996 |
| JP | 2000-11644 | 1/2000 |
| WO | WO 95/16301 | 6/1995 |

\* cited by examiner

*Primary Examiner*—Jeffrey Sterrett
(74) *Attorney, Agent, or Firm*—Dickstein Shapiro Morin & Oshinsky LLP

(57) ABSTRACT

A power supply apparatus includes a plurality of power source circuits, an oscillator circuit and a controller. The plurality of power source circuits use a common direct current power source. The oscillator circuit generates a plurality of oscillator signals. The controller performs a time sharing control based on the plurality of oscillator signals to enable the plurality of power source circuits to receive power from the common direct current power source in different timings and to output respective voltages.

19 Claims, 5 Drawing Sheets

POWER SUPPLY METHOD AND APPARATUS

This patent application claims priority to Japanese patent application, No. 2002-282524 filed on Sep. 27, 2002 in the Japanese Patent Office, which is hereby incorporated by reference in its entirety.

The present invention relates generally to a power supply method and apparatus capable of efficiently supplying a plurality of switchable power sources.

BACKGROUND OF THE INVENTION

A conventional power source apparatus, having a plurality of power source circuits, achieves compactness and consumes less-power by using a common oscillator circuit. One exemplary power supply apparatus is described in Japanese Laid-Open Patent Application Publication No. 2000-11644.

In a typical example, a step-up circuit and a step-down circuit, which operate with a common oscillator circuit, output two different voltages from a common direct current power source. The step-up and step-down circuits may operate simultaneously to consume large power, causing noise in the direct current power source. In such a system, it is difficult to apply the use of common clock signal to items such as cellular phones because excessive noise is generated in the power source.

BRIEF SUMMARY OF THE INVENTION

Under an exemplary embodiment, a novel power supply apparatus includes a plurality of power source circuits, an oscillator circuit and a controller. The plurality of power source circuits use a common direct current power source. The oscillator circuit generates a common oscillator signal. The controller performs a time sharing control, based on the oscillator signal received to enable the plurality of power source circuits to receive power from the common direct current power source in different timings and to output respective voltages. The respective voltages may be different from each other.

The above-mentioned power supply apparatus may further include a selection circuit under an alternate embodiment, wherein the selection circuit selects at least two power source circuits out of a plurality of power source circuits. Under this configuration, the controller may perform time sharing control to enable the selected power source circuits to receive power from the common direct current power source based on the oscillator signal.

The plurality of power source circuits may include a voltage-step-up circuit, a voltage-step-down circuit, and a multiplicative voltage-step-up circuit under another embodiment of the invention. The selection circuit may select one of the combinations of voltage-step-up and voltage-step-down circuits and the voltage-step-down and multiplicative voltage-step-up circuits. The controller may perform time sharing control based on an oscillator signal to enable one of the combinations of voltage-step-up and voltage-step-down circuits, and the voltage-step-down and multiplicative voltage-step-up circuits selected by the selection circuit to receive power from the common direct current power source. The voltage step-down circuit may receive power from the common direct current power source with a substantially identical timing when either one of the combinations is selected.

Further, under another embodiment, a novel power supply method is disclosed that includes the steps of providing a power source, generating oscillator signals, and performing a time sharing control function. The providing step provides a plurality of power source circuits with a common direct current power source. The generating step generates a common oscillator signal, and the performing step performs a time sharing control based on the oscillator signal to enable the plurality of power source circuits to receive power from the common direct current power source in different timings and to output respective voltages. The respective voltages may be different from each other.

The above-mentioned power supply method may further include the steps of selecting at least two power source circuits out of the plurality of power source circuits. Under this power supply configuration, a controlling step may perform the time sharing control based on the oscillator signal to enable the selected at least two power source circuits to receive power from the common direct current power source in different timings, and to output respective voltages.

The plurality of power source circuits may include a voltage-step-up circuit, a voltage-step-down circuit, and a multiplicative voltage-step-up circuit. The selecting step may select one of the combinations of voltage-step-up and voltage-step-down circuits and the voltage-step-down and multiplicative voltage-step-up circuits. The performing step may perform time sharing control based on the oscillator signals to enable one of the combinations of the voltage-step-up and voltage-step-down circuits, and the voltage-step-down and multiplicative voltage-step-up circuits selected by the selecting step to receive power from the common direct current power source in different timings and to output respective voltages. The voltage step-down circuit may receive power from the common direct current power source with a substantially identical timing when either one of the combinations is selected.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, in which.

DETAILED DESCRIPTION OF THE INVENTION

Figure 1A:
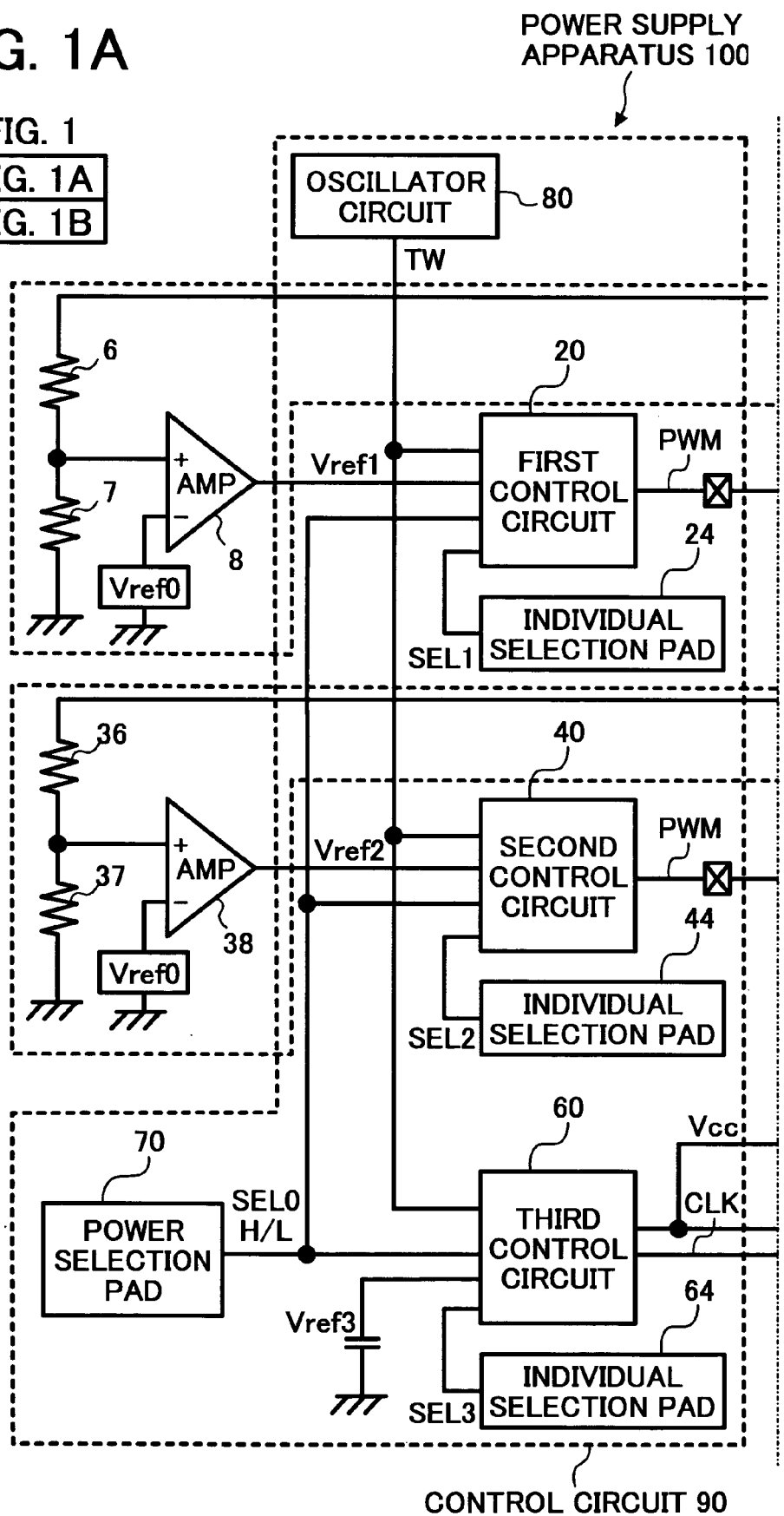
FIG. 1 is a diagram illustrating an exemplary structure of a power source apparatus according to an exemplary embodiment of the present invention.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIG. 1, a power supply apparatus 100 according to a preferred embodiment of the present invention is now described. The power supply apparatus 100 may be used to power external devices, such as a cellular phone, for example.

A power source apparatus of the present invention performs a time sharing control to enable a plurality of power source circuits, generating different voltages from a common direct current power source, to receive power from the direct current power source based on oscillator signals output from a common oscillator circuit. The plurality of circuits are prevented from simultaneously consuming a large amount of power, thus avoiding noise generated in the direct current power source.

An embodiment of a power source control circuit in accordance with the present invention will be described below with reference to drawings.

Figure 1B:
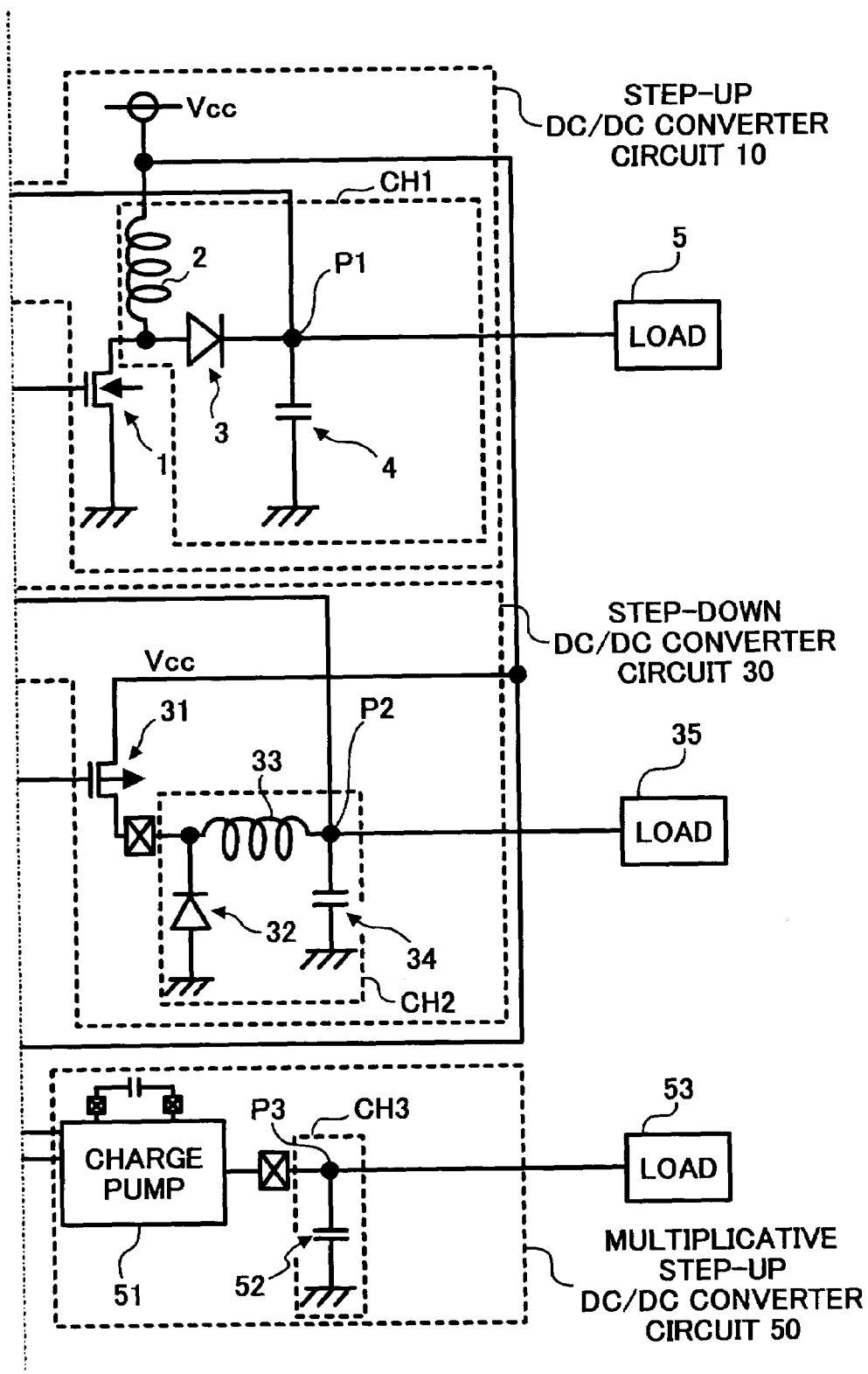

FIG. 1 is a diagram illustrating an exemplary structure of a power supply apparatus 100. The power supply apparatus 100 includes three power source circuits of a step-up direct-current-to-direct-current (DC/DC) converter circuit 10, a step-down direct-current-to-direct-current (DC/DC) converter circuit 30 and a multiplicative step-up direct-current-to-direct-current (DC/DC) converter circuit 50, and one control circuit 90. The step-up DC/DC converter circuit 10 uses a common direct current source $V_{CC}$. The control circuit 90 controls operations of two of the three power source circuits in accordance with a time sharing operation based on a triangular waveform TW which is an oscillator signal output by an oscillator circuit 80. The two power source circuits are selected by a selection signal SEL0 applied to a power selection pad 70.

The step-up DC/DC converter circuit 10 is a power source, for example, for an organic electroluminescence (EL) panel of the cellular phone. The step-down DC/DC converter circuit 30 is a power source used, for example, for features of a calling and a light-emitting diode (LED) button lighting of the cellular phone. The multiplicative step-up DC/DC converter circuit 50 is a power source, for example, for a white light-emitting diode (LED) of the cellular phone. In the present embodiment, the organic EL panel and the white LED are used selectively, and not simultaneously. Under actual use, the power source apparatus 100 can be used in combination with step-up DC/DC converter circuit 10 and step-down DC/DC converter circuit 30, or step-down DC/DC converter circuit 30 and the multiplicative step-up DC/DC converter circuit 50 based on a value of the signal SEL0 applied to the power selection pad 70.

The step-up DC/DC converter circuit 10 connects a direct current source $V_{CC}$ to a drain terminal of an N-channel metal oxide semiconductor field-effect transistor (MOSFET) semiconductor switch 1 through a coil 2. The step-up DC/DC converter circuit 10 also connects a capacitor 4 and a load 5 (e.g., panel) to the drain terminal of the N-channel MOSFET semiconductor switch 1 through a diode 3. A source terminal of the semiconductor switch 1 is connected to ground. A potential of an output terminal P1 connected to the diode 3 and the load 5 is resistively divided through resistors 6 and 7 and subsequently input to a positive signal input terminal of an operational amplifier 8.

For ease of explanation, Vref3 represents half the value of an amplitude of the triangular waveform TW output from the oscillator circuit 80. That is, Vref3 is a standard value expressed as: $(V^{+}+V^{-})/2$, where $V^{+}$ is the maximum value of the triangular waveform TW and $V^{-}$ is the minimum value of the triangular waveform TW.

The operational amplifier 8 outputs a standard value Vref1 greater than the Vref3 based on a difference between the potential, resistively divided by the resistors 6 and 7, and a standard value Vref0 input to a negative signal input terminal of the operational amplifier 8.

As will be explained in greater detail below, a first control circuit 20, which includes the control circuit 90, compares the input standard value Vref1 with the triangular waveform TW output by the oscillator circuit 80 to generate a pulse-width modulation (PWM) signal. The PWM signal is then applied to a gate terminal of the semiconductor switch 1. When the PWM signal output from the first control circuit 20 is at a low level, the step-up DC/DC converter circuit 10 receives power from the direct current source $V_{CC}$ for storage in a first power storage device CH1.

The step-down DC/DC converter circuit 30 connects the direct current source $V_{CC}$ to a source of a P-channel metal oxide semiconductor field-effect transistor (MOSFET) semiconductor switch 31. As shown, the step-down DC/DC converter circuit 30 also connects diode 32, coil 33, capacitor 34, and load 35 (e.g., features of the calling and the LED button lighting) to a drain terminal of the P-channel MOSFET semiconductor switch 31. A potential of an output terminal P2, connected to the coil 33 and the load 35, is resistively divided through resistors 36 and 37 and subsequently input to a positive signal input terminal of an operational amplifier 38. The operational amplifier 38 outputs a standard value Vref2 smaller than the Vref3 based on a difference between the potential resistively divided by the resistors 36 and 37, and the standard value Vref0 input to a negative signal input terminal of the operational amplifier 38.

As will be explained in greater detail below, a second control circuit 40, which includes the control circuit 90, compares the input standard value Vref2 with the triangular waveform TW output by the oscillator circuit 80 to generate a PWM signal, which is applied to a gate terminal of the semiconductor switch 31. When the PWM signal output from the second control circuit 40 is at a low level, the step-up DC/DC converter circuit 30 receives power from the direct current source $V_{CC}$ for storage in a second power storage device CH2.

It should be understood that the step-down DC/DC converter circuit 30 may be substituted with other converters, such as a synchronous rectification type converter.

The multiplicative step-up DC/DC converter circuit 50 includes a charge pump 51 and a capacitor 52. The charge pump 51 is connected to a load 53 (e.g., LED) through output terminal P3. The charge pump 51 is driven by a direct current power source $V_{CC}$ and a clock signal. The capacitor 52 operates as a third power storage device CH3. When the input clock signal is at a low level, the multiplicative step-up DC/DC converter circuit 50 receives power from the direct current source $V_{CC}$ for storage in the third power storage device CH3.

The control circuit 90 includes a first control circuit 20, a second control circuit 40, and a third control circuit 60. The first control circuit 20 controls the PWM signal output which serves as a drive signal for the step-up DC/DC converter circuit 10. The second control circuit 40 controls the PWM signal output which serves as a drive signal for the step-down DC/DC converter circuit 30. The third control circuit 60 controls an output of an operating clock signal CLK to the multiplicative step-up DC/DC converter circuit 50. The first and third control circuits 20 and 40 receive a selection signal SEL0 which is supplied from the power selection pad 70.

When the selection signal SEL0 applied by the power selection pad 70 is at a high level, the control circuit 90 performs time sharing control so that the step-up DC/DC converter circuit 10 and the step-down DC/DC converter circuit 30 receive power from the direct current source $V_{CC}$. On the other hand, when the selection signal SEL0 is at a low level, the control circuit 90 performs the time sharing control so that the step-down DC/DC converter circuit 30 and the multiplicative step-up DC/DC converter circuit 50 receive power from the direct current power source $V_{CC}$. In both cases, the step-down DC/DC converter circuit 30 operates with the same timing.

The first control circuit 20, the second control circuit 40, and the third control circuit 60 receive selection signals, SEL1, SEL2 and SEL3 through selection pads, 24, 44 and 64. The first control circuit 20, the second control circuit 40 and the third control circuit 60 are enabled when the selection signals SEL1, SEL2 and SEL3 are at high levels.

The first control circuit 20 generates a PWM signal for switching to a low level when the triangle waveform TW has a value more than Vref1, which is greater than the Vref3. Then, the first control circuit 20 outputs the PWM signal to the semiconductor switch 1 of the step-up DC/DC converter circuit 10 to serve as a driving signal (see FIG. 2B, described below).

The second control circuit 40 generates the PWM signal for switching to a low level when the triangle waveform TW has a value less than Vref2 (which is smaller than the Vref3). Then, the second control circuit 40 outputs the PWM signal to the semiconductor switch 31 of the step-down DC/DC converter circuit 30 to serve as a driving signal (see FIG. 3B, described below).

The third control circuit 60 generates the clock signal CLK with a duty ratio of approximately 50% which is at a low level when the triangle waveform TW has a value greater than Vref3. Subsequently, the third control circuit 60 supplies the clock signal CLK with the charge pump 51 of the multiplicative step-up DC/DC converter circuit 50 (see FIG. 4B, described below).

As described above, the first and second control circuits 20 and 40, or the second and third control circuits 40 and 60, are enabled in accordance with a value of the selection signal SEL0. As will be explained in greater detail hereinafter, the enabled control circuits control the first power storage device CH1 of the step-up DC/DC converter circuit 10 and the second power storage device CH2 of the step-down DC/DC converter circuit 30, or the second power storage device CH2 of the step-down DC/DC converter circuit 30 and the third power storage device CH3 of the multiplicative step-up DC/DC converter circuit 50 through time sharing to avoid storing charges simultaneously. This control eliminates simultaneous power consumption from a plurality of circuits and a significant decrease in the shared direct current power source $V_{CC}$, thereby reducing the resultant noise generated in the direct current power source $V_{CC}$.

Figure 2A:
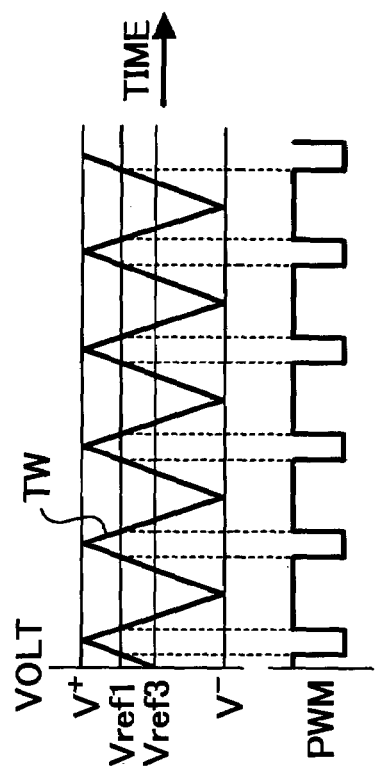
FIG. 2A is a diagram illustrating a first control circuit of a power source control circuit included in the power source apparatus of FIG. 1.

FIG. 2A illustrates an exemplary structure of the first control circuit 20. The first control circuit 20 receives a triangular waveform TW, a standard value Vref1 output from the step-up DC/DC converter circuit 10, and selection signals SEL0 and SEL1. As mentioned above, the operational amplifier 8 of the step-up DC/DC converter circuit 10 has the standard value Vref1 greater than the Vref3.

The first control circuit 20 includes a comparator 21 and two AND gates 22 and 23. Comparator 21 compares the triangular waveform TW with the standard value Vref1 to output a low level signal when the triangular waveform TW has a value greater than the standard value Vref1. An output terminal of the comparator 21 is connected to one input terminal of a 2-input AND gate 22. The other input terminal of AND gate 22 receives the selection signal SEL0 from the power selection pad 70. The AND gate 22 outputs a signal to one terminal of AND gate 23 of the next stage when the selection signal SEL0 is at a high level. The other input terminal of 2-input AND gate 23 receives the selection signal SEL1 from the individual selection pad 24. The AND gate 23 outputs an output signal as a PWM signal when the selection signal SEL1 is a high level.

Figure 2B:
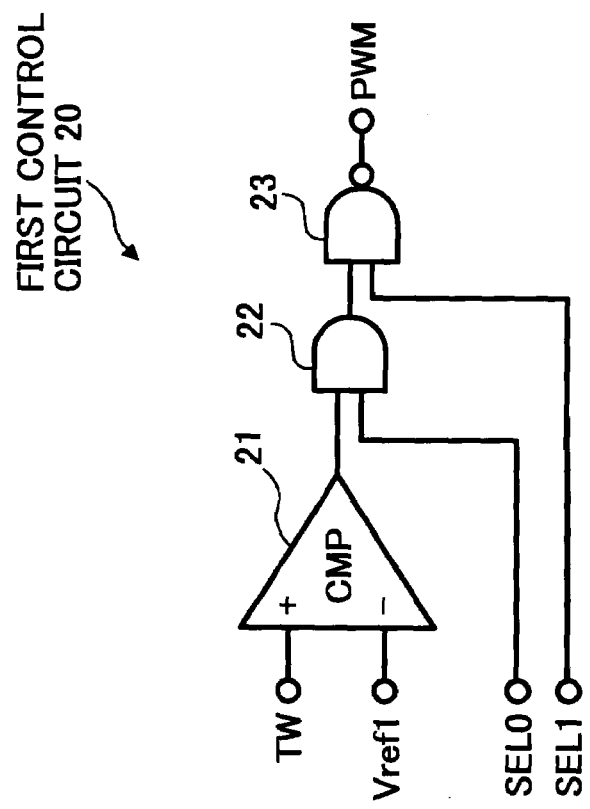
FIG. 2B is a diagram illustrating a pulse-width modulated (PWM) signal output from the first control circuit.

FIG. 2B is a illustrates the output PWM signal in the above-configured first control circuit 20, when the selection signals SEL0 and SEL1 are at high levels.

Figure 3B:
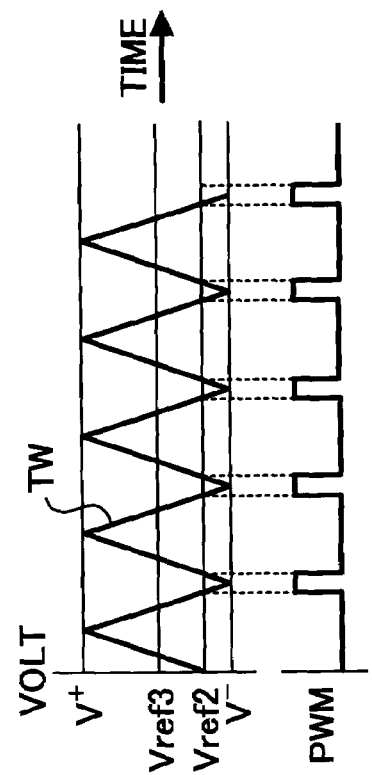
FIG. 3B is a diagram illustrating a PWM signal output from the second control circuit.
Figure 3A:
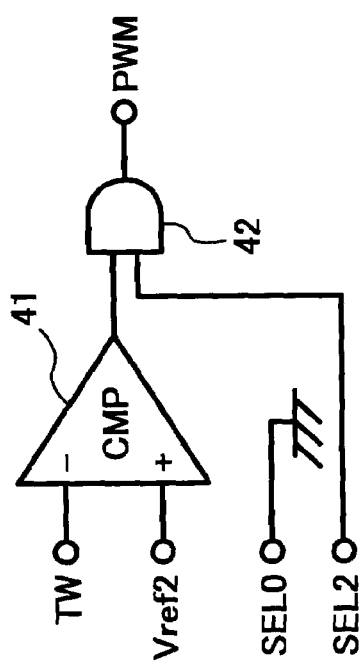
FIG. 3A is a diagram illustrating a second control circuit of a power source control circuit included in the power source apparatus of FIG. 1.

FIG. 3A illustrates an exemplary structure of the second control circuit 40. The second control circuit 40 receives a triangular waveform TW, a standard voltage Vref2 output from the step-down DC/DC converter circuit 30, and a selection signal SEL2. As described above, the operational amplifier 38 of the step-down DC/DC converter circuit 30 has the standard value Vref2 smaller than the Vref3.

The second control circuit 40 further includes a comparator 41 and an AND gate 42. The comparator 41 compares the triangular waveform TW with the standard value Vref2 to output a low level signal when the triangular waveform TW has a value smaller than the Vref2. An output terminal of the comparator 41 is connected to an input terminal of 2-input AND gate 42. The other signal input terminal of AND gate 42 receives selection signal SEL2 from the selection pad 44. The AND gate 42 outputs an output signal as a PWM signal when the selection signal SEL2 is at a high level. The second control circuit 40 is not affected by the value of the selection signal SEL0 input to the power selection pad 70.

FIG. 3B illustrates an exemplary output PWM signal in the above-configured second control circuit 20 when the selection signal SEL2 is at a high level.

Figure 4A:
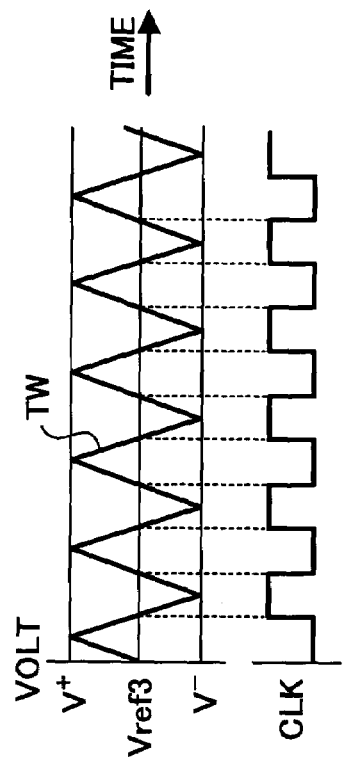
FIG. 4A is a diagram illustrating a third control circuit of a power source control circuit included in the power source apparatus of FIG. 1.

FIG. 4A illustrates an exemplary structure of the third control circuit 60. The third control circuit 60 receives a triangular waveform TW, a standard value Vref3, which is half the value of the amplitude of the triangular waveform TW, and a selection signals SEL0 and SEL1. The third control circuit 60 includes a comparator 61, and AND gates 62 and 63. The comparator 61 compares the triangular waveform TW with the standard value Vref3 to output a low level signal when the triangular waveform TW has a value greater than the standard value Vref3. An output terminal of the comparator 61 is connected to an input terminal of 2-input AND gate 62. The other signal input terminal of the AND gate 62 inversely receives the selection signal SEL0 from the power selection pad 70. AND gate 62 outputs a to AND gate 63 of the next stage, when the selection signal SEL0 is a high level. The other input terminal of 2-input AND gate 63 receives the selection signal SEL3 from selection pad 64. The AND gate 63 outputs an output signal as a PWM signal when the selection signal SEL3 is a high level.

Figure 4B:
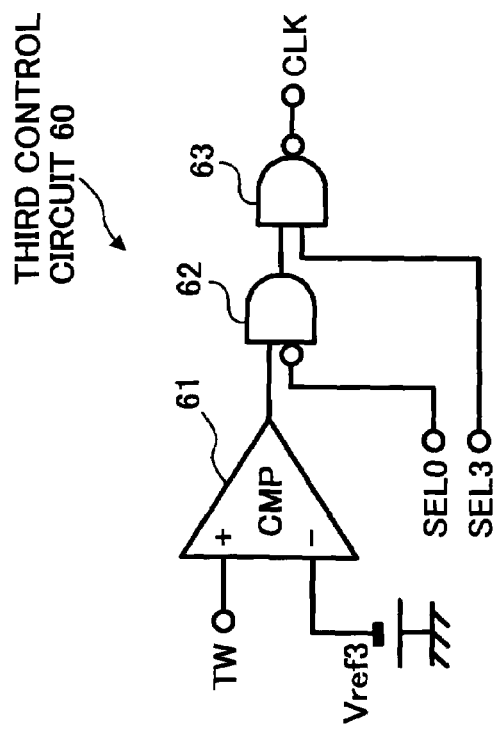
FIG. 4B is a diagram illustrating a clock signal CLK output from the third control circuit.

FIG. 4B illustrates an exemplary output PWM signal in the above-configured third control circuit 60 when the selection signals SEL0 and SEL1 are high levels.

As mentioned above, the step-up DC/DC converter circuit 10 stores a charge in the first power storage device CH1 when the PWM signal shown in FIG. 2B is at a low level. In addition, the step-down DC/DC converter circuit 30 stores a charge in the second power storage device CH2 when the PWM signal shown in FIG. 3B is at a low level. As can be seen from FIGS. 2B and 3B, the step-up DC/DC converter circuit 10 and the step-down DC/DC converter circuit 30 do not store charges simultaneously. Thus, the apparatus performs a time sharing operation. This arrangement eliminates a simultaneous power consumption of the direct current power source $V_{CC}$, thereby reducing resultant noise in the direct current power source $V_{CC}$.

As mentioned above, the multiplicative step-up DC/DC converter circuit 50 stores a charge in the third power storage device CH3 when the clock signal shown in FIG. 4B is a low level. Therefore, as can be seen from FIGS. 3B and 4B, the step-down DC/DC converter circuit 30 and the multiplicative step-up DC/DC converter circuit 50 do not store charges simultaneously. Thus, the apparatus performs a time sharing operation. This arrangement eliminates a simultaneous power consumption of the direct current power source $V_{CC}$, thereby reducing resultant noise in the direct current power source $V_{CC}$, As seen by reference to FIGS. 2B, 3B and 4B, the step-down DC/DC converter circuit 30 receives power (stores a charge) from the direct current source $V_{CC}$ with the same timing even when it operates with either the step-up DC/DC converter circuit 10 or the multiplicative step-up DC/DC converter circuit 50.

All of the power source circuits may also be stopped by setting all selection pads 24, 44 and 64 into high level selection signals SEL1, SEL2 and SEL3, respectively. Moreover, a combination of the selection signal SEL0, input by the power selection pad 70, enables only one power source circuit to operate.

Numerous additional modifications and variations are possible in light of the above teachings. It is therefore to be understood that within the scope of the appended claims, the disclosure of this patent specification may be practiced otherwise than as specifically described herein.

What is claimed as new and desired to be protected by Letters Patent of the United States is:

1. A power supply apparatus, comprising:
    a plurality of power source circuits with a common direct current power source;
    an oscillator circuit which generates a common oscillator signal; and
    a controller comprising a plurality of control circuits respectively coupled to control said plurality of power source circuits, said plurality of control circuits commonly receiving said common oscillator signal and performing a time sharing control based on the oscillator signal to enable the plurality of power source circuits to receive power from the common direct current power source in different timings and to output respective voltages,
    wherein said plurality of power source circuits comprises at least two different types of converter circuits.

2. The power supply apparatus according to claim 1, wherein the respective voltages are different from each other.

3. The power supply apparatus according to claim 2, further comprising:
    a selection circuit, selecting at least two power source circuits out of the plurality of power source circuits,
    wherein the controller performs the time sharing control to enable the selected at least two power source circuits to receive power from the common direct current power source based on the oscillator signal.

4. The power supply apparatus according to claim 3, wherein the plurality of power source circuits include a voltage-step-up circuit, a voltage-step-down circuit, and a multiplicative voltage-step-up circuit, wherein
    the selection circuit selects one of a combination of the voltage-step-up and voltage-step-down circuits and the voltage-step-down and multiplicative voltage-step-up circuits, and wherein
    the controller performs the time sharing control based on the oscillator signal to enable one of the combination of the voltage-step-up and voltage-step-down circuits and the voltage-step-down and multiplicative voltage-step-up circuits selected by the selection circuit to receive power from the common direct current power source, and
    wherein the voltage step-down circuit receives power from the common direct current power source with a substantially identical timing when either one of the combinations is selected.

5. A power supply apparatus, comprising:
    a plurality of power generating means for generating a plurality of different output powers based on a common direct current power source;
    oscillating means for generating a common oscillator signal; and
    controlling means comprising a plurality of control circuits respectively coupled to control said plurality of power generating means, said plurality of control circuits commonly receiving said common oscillator signal and performing a time sharing control based on the oscillator signal to enable the plurality of power generating means to receive power from the common direct current power source in different timings and to output respective voltages,
    wherein said plurality of power generating means comprises at least two different types of converting means.

6. The power supply apparatus according to claim 5, wherein the respective voltages are different from each other.

7. The power supply apparatus according to claim 6, further comprising:
    selecting means for selecting at least two power generating means out of the plurality of power generating means,
    wherein the controlling means performs the time sharing control to enable the selected at least two power generating means to receive power from the common direct current power source based on the oscillator signal.

8. The power supply apparatus according to claim 7, wherein the plurality of power generating means include voltage-step-up means for generating a step-up voltage, voltage-step-down means for generating a step-down voltage, and multiplicative voltage-step-up means for generating a multiplicative step-up voltage, wherein
    the selecting means selects one of a combination of the voltage-step-up and voltage-step-down means, and the voltage-step-down and multiplicative voltage-step-up means, and wherein
    the controlling means performs the time sharing control based on the oscillator signal to enable one of the combination of the voltage-step-up and voltage-step-down means and the voltage-step-down and multiplicative voltage-step-up means selected by the selecting means to receive power from the common direct current power source in different timings and to output respective voltages, and
    wherein the voltage step-down means receives power from the common direct current power source with a substantially identical timing when either one of the combinations is selected.

9. A power supply method, comprising the steps of:
    providing a plurality of power source circuits with a common direct current power source;
    generating a common oscillator signal, and performing a time sharing control based on the common oscillator signal to enable the plurality of power source circuits to receive power from the common direct current power source under different timings and to output respective voltages, wherein said step of performing a time sharing control is performed by a controller comprising a plurality of control circuits respectively coupled to control said plurality of power source circuits, said plurality of control circuits commonly receiving said common oscillator signal, and wherein said plurality of power source circuits comprises at least two different types of converter circuits.

10. The power supply method according to claim 9, wherein the respective voltages are different from each other.

11. The power supply method according to claim 10, further comprising the steps of:

selecting at least two power source circuits out of the plurality of power source circuits, wherein a controlling step performs the time sharing control based on the oscillator signal to enable the selected at least two power source circuits to receive power from the common direct current power source in different timings.

12. The power supply method according to claim 11, wherein the plurality of power source circuits include a voltage-step-up circuit, a voltage-step-down circuit, and a multiplicative voltage-step-up circuit, and wherein the selecting step selects one of a combination of the voltage-step-up and voltage-step-down circuits, and the voltage-step-down and multiplicative voltage-step-up circuits, and wherein the performing step performs the time sharing control based on the oscillator signal to enable one of the combination of the voltage-step-up and voltage-step-down circuits, and the voltage-step-down and multiplicative voltage-step-up circuits, selected by the selecting step, to receive power from the common direct current power source in different timings and to output respective voltages, and wherein the voltage step-down circuit receives power from the common direct current power source with a substantially identical timing when either one of the combinations is selected.

13. A power supply apparatus, comprising:

a plurality of power source circuits with a common direct current power source;

an oscillator circuit which generates a common oscillator signal; and a controller comprising a plurality of control circuits respectively coupled to control said plurality of power source circuits, said plurality of control circuits commonly receiving said common oscillator signal and performing a time sharing control based on an edge of the oscillator signal to enable the plurality of power source circuits to receive power from the common direct current power source in different timings and to output respective voltages, wherein said plurality of power source circuits comprises at least two different types of converter circuits.

14. The power supply apparatus according to claim 13, wherein the respective voltages are different from each other.

15. The power supply apparatus according to claim 14, further comprising:

a selection circuit, selecting at least two power source circuits out of the plurality of power source circuits, wherein the controller performs the time sharing control to enable the selected at least two power source circuits to receive power from the common direct current power source based on the oscillator signal.

16. The power supply apparatus according to claim 15, wherein three of the plurality of power source circuits respectively comprise a voltage-step-up circuit, a voltage-step-down circuit, and a multiplicative voltage-step-up circuit, wherein the selection circuit selects one of a combination of the voltage-step-up and voltage-step-down circuits and the voltage-step-down and multiplicative voltage-step-up circuits, and wherein the controller performs the time sharing control based on the oscillator signal to enable one of the combination of the voltage-step-up and voltage-step-down circuits and the voltage-step-down and multiplicative voltage-step-up circuits selected by the selection circuit to receive power from the common direct current power source, and wherein the voltage step-down circuit receives power from the common direct current power source with a substantially identical timing when either one of the combinations is selected.

17. The power supply apparatus according to claim 16, wherein the combination of the voltage-step-up and voltage-step-down circuits is triggered on an edge of the oscillator signal when the voltage level of the edge is at a first reference value.

18. The power supply apparatus according to claim 17, wherein the combination of the voltage-step-down and multiplicative voltage-step-up circuits is triggered on an edge of the oscillator signal when the voltage level of the edge is at a second reference value.

19. A power supply control apparatus, comprising:

an oscillator circuit which generates a common oscillator signal;

a plurality of independently controllable power source circuits with a common direct current power source, at least one of the plurality of power source circuits comprising:

an electric storage circuit;

a semiconductor switch for controlling a storage of an electric power supplied by the common direct current power source into the electric storage circuit;

an error amplifier for comparing a divided voltage obtained by dividing an output voltage and a reference voltage to output a control signal such that the divided voltage is equalized to the reference voltage; and a controlling circuit for determining a time to start the storage of the electric power supplied by the common direct current power source into the electric storage circuit based on the control signal output by the error amplifier and the common oscillator signal generated by the oscillator circuit, wherein the controlling circuit determines the time to start the storage of the electric power differently from times that remaining power source circuits of the plurality of power source circuits start the storage of the electric power.

* * * * *